May 13, 1958 G. G. ANDERSON ET AL 2,834,863
ELECTRIC HEATING UNIT ASSEMBLY
Filed Feb. 1, 1956 2 Sheets-Sheet 1
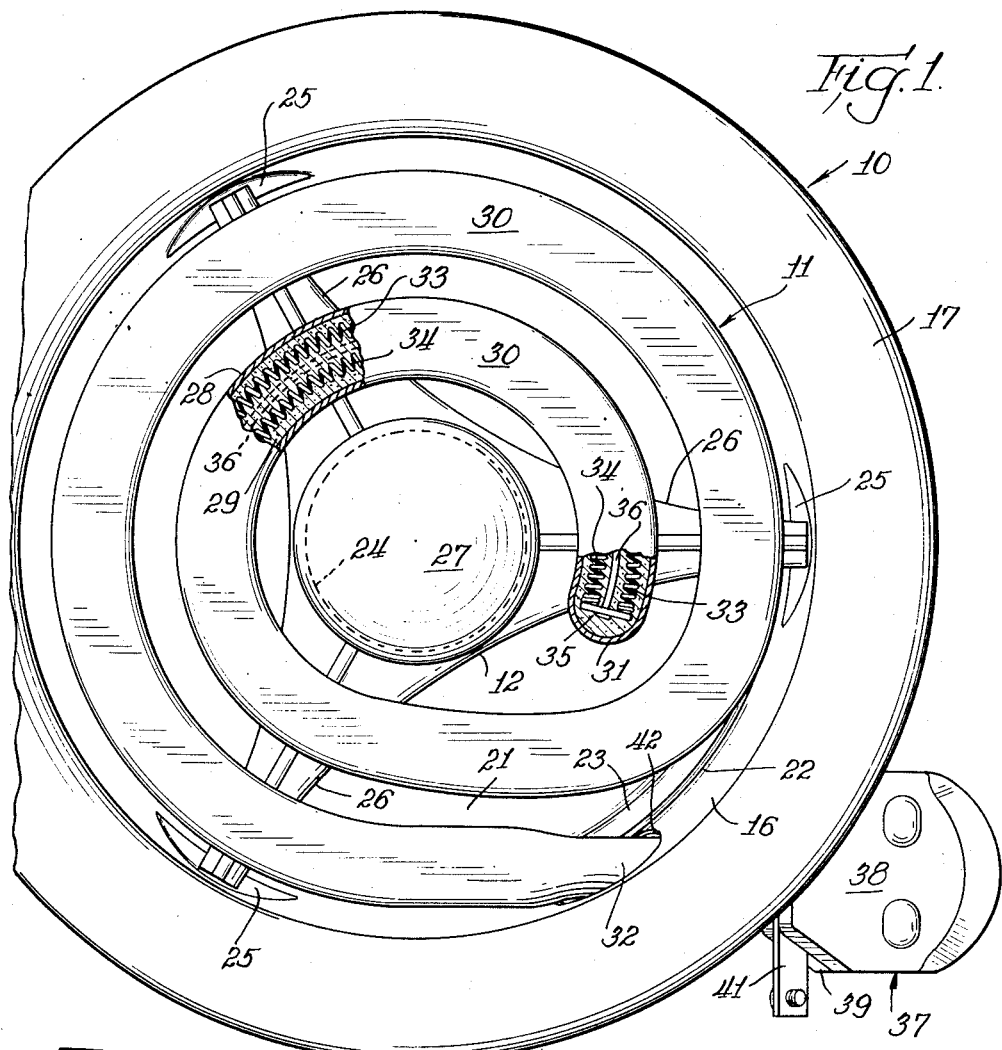
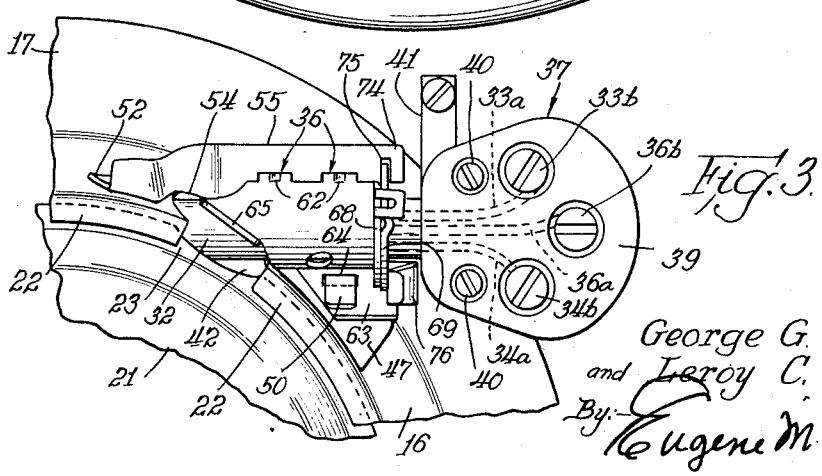
INVENTORS:
George G. Anderson
and Leroy C. Hanson
By Eugene M. Giles
Atty.

May 13, 1958  G. G. ANDERSON ET AL  2,834,863
ELECTRIC HEATING UNIT ASSEMBLY
Filed Feb. 1, 1956  2 Sheets-Sheet 2
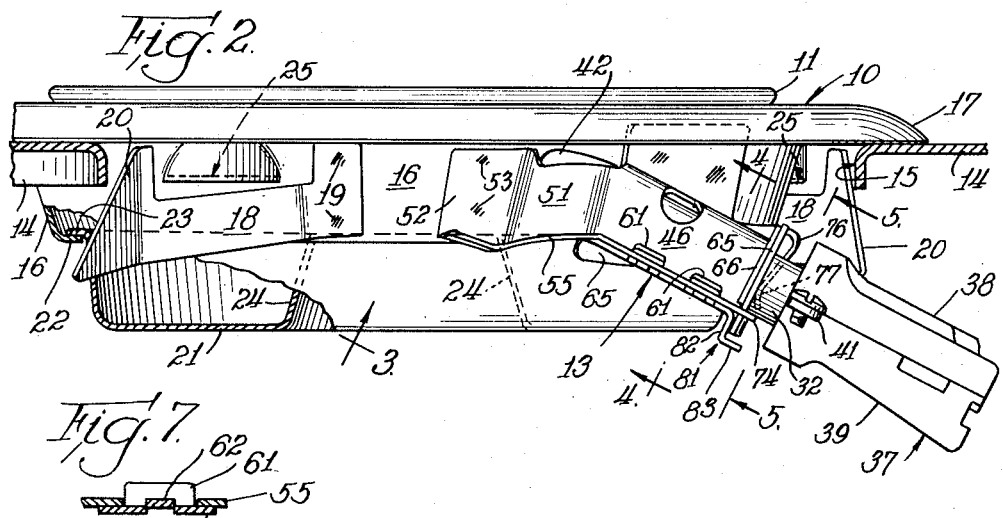
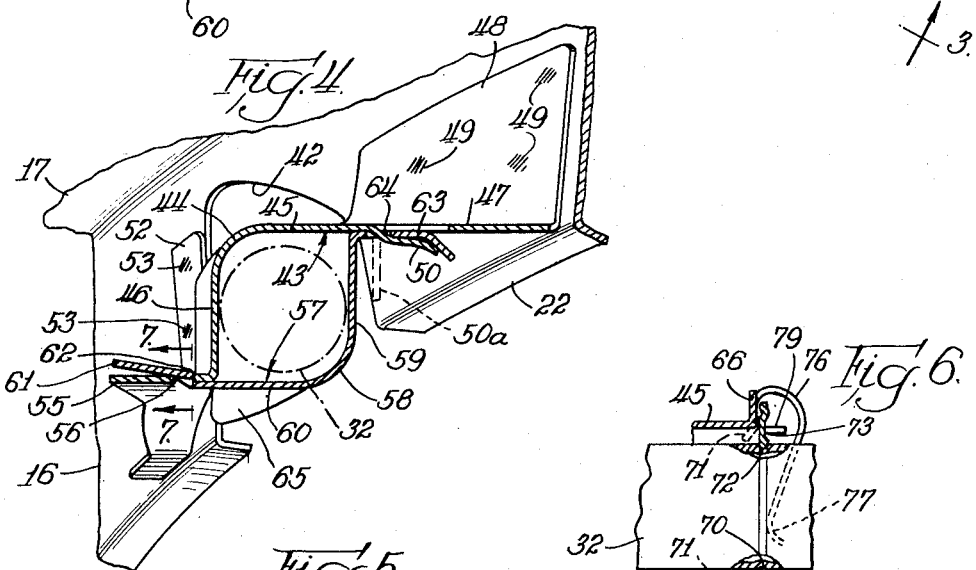
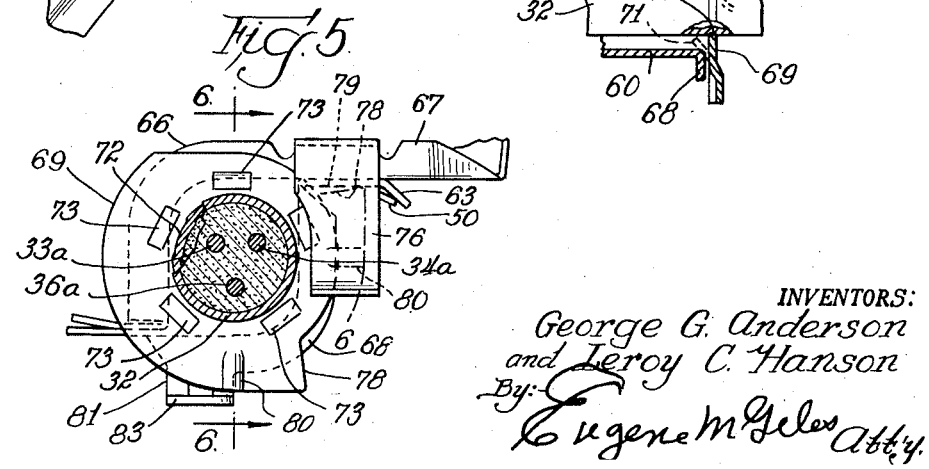
INVENTORS:
George G. Anderson
and Leroy C. Hanson
By: Eugene M. Giles Atty.

United States Patent Office 2,834,863
Patented May 13, 1958

2,834,863

ELECTRIC HEATING UNIT ASSEMBLY

George G. Anderson, Fox River Grove, and Leroy C. Hanson, Elmhurst, Ill., assignors, by mesne assignments, to Ferro Corporation, Cleveland, Ohio, a corporation of Ohio Application February 1, 1956, Serial No. 562,757

11 Claims. (Cl. 219—37)

This invention relates to electrical heating units of the type employed for surface heating in electric ranges and has reference more particularly to the assembly thereof with a mounting ring.

In electric ranges it is customary to provide the range top with openings at the respective places where the heating units are to be located and each heating unit is generally prepared in an assembly with a mounting ring which fits in the range top opening and supports the heating unit therein.

The heating unit is supported in the top of the mounting ring with the top face thereof at a sufficient elevation above the ring and the range top so that a cooking utensil or pan rests thereon in the cooking position and the ring is provided with a pan-like bottom which underlies the heating unit to reflect heat upwardly and catch drippings or spillage from the cooking operations on the heating unit.

This pan-like bottom is sometimes made as an integral part of the ring but preferably is a separate part which is removable for convenient washing and cleaning.

The heating unit is commonly combined with the ring in a complete unitary assembly ready for mounting in the range top, and it is customary to hinge the heating unit to the ring at one side of the latter so that the heating unit may be lifted to an upraised position at the hinged side of the ring affording free access to the interior of the ring and to the pan for cleaning and removal of the pan, if a removable pan is employed.

For supporting the heating unit in the normal horizontal position in the ring a spider is usually employed which is removably located within the upper portion of the ring in a manner to afford a rigid underlying support for the heating unit, and this spider is sometimes attached to the underside of the coils of the heating unit to lift therewith to the upraised position, although it is preferred to utilize a spider which is separate from the heating unit and removably mounted in the ring, as the attached spider may interfere with expansion and contraction of the heating unit coils, and also makes it difficult to clean the underside of the heating unit; and moreover when the spider is separate from the heating unit it may be completely removed from the heating unit assembly for convenient washing and cleaning.

It is important that the heating unit be hinged to the ring in a manner to lift readily to an upraised position sufficiently out of the way to provide unobstructed access to the interior of the mounting ring and return readily to its normal position in the top of the ring, and that the hinging be accomplished in a manner which is neat and efficient, and moreover the hinging must be so arranged and sufficiently loose to permit complete freedom of the heating unit to lay flatwise and solidly in its utensil supporting position in the top of the ring.

It is also important for the sake of economical manufacture that the parts of the assembly be readily combinable into the unitary structure without inconvenience or waste of time, such as usually occurs when a number of separate parts have to be handled and are fastened together with nuts and bolts or the like, which are tedious to apply, and that the parts be securely combined in the assembly in such manner that no parts can become loose or disarranged in handling and installation of the units or throughout the use of the assembly in the range.

The principal objects of the invention are, to provide an improved assembly of heating unit and heating unit mounting and minimize the cost thereof; to simplify and facilitate the assembling thereof; to insure a sturdy, reliable and trouble free assembly; to minimize the number of separate parts which it is necessary to handle in making up the assembly and permit elimination of nuts and bolts or the like; to avoid any parts which may become loose or disarranged; and to provide a heating unit and mounting assembly which is unusually simple, neat, compact, convenient and functionally efficient, these and other objects being accomplished as pointed out more particularly hereinafter and as shown in the accompanying drawings, in which:

Fig. 1 is a top view of a heating unit and mounting ring assembly made in accordance with the present invention;

Fig. 2 is a view taken from the bottom of Fig. 1 and showing the side of the mounting ring at which the heating unit is hinged thereto;

Fig. 3 is a bottom view of a fragmentary portion of the assembly taken on the line 3—3 of Fig. 2 and showing the facilities by which the heating unit is hinged to the shell;

Fig. 4 is an enlarged sectional view on the line 4—4 of Fig. 2 and showing parts thereof in perspective;

Fig. 5 is an enlarged sectional view taken on the line 5—5 of Fig. 2 and showing particularly the end stop disk and omitting certain parts beyond the hinge;

Fig. 6 is a detail view partly in section on the line 6—6 of Fig. 5 showing particularly the end stop disk and parts with which it cooperates; and Fig. 7 is a fragmentary detail sectional view on the line 7—7 of Fig. 4.

Referring to the drawings, and particularly to Figs. 1 and 2 thereof which show the heating unit and mounting ring assembly, the reference numeral 10 indicates the mounting ring as a whole and 11 the heating unit as a whole which is normally supported in the top of the mounting ring on a spider 12 so that the top surface thereof is at a slight elevation above the top of the mounting ring, as shown in Fig. 2; the heating unit having an extension which projects through an opening in the side wall of the mounting ring to the outer side thereof where it is hinged to the mounting ring as at 13 so that the heating unit is permanently attached to the mounting ring to constitute therewith a complete assembly ready for installation in a range top and is adapted by reason of the hinging thereof at 13 to be swung upwardly from its normal portion on the spider 12 to an upraised position at the hinge side of the mounting ring 10.

This assembly is adapted to be mounted in an opening of a range top, a fragmentary portion of such range top being indicated at 14 in Fig. 2 with an opening 15 therethrough in which the assembly is inserted and the mounting ring 10 has an annular side wall 16 which slopes inwardly and downwardly, as shown in Fig. 2, and is inserted in the range top opening 15 and has a flange 17 therearound at the top which extends over and rests on the marginal portion of the range top 14 around the opening 15 to support the assembly in the opening. Facilities are provided for centering and retaining the assembly in the opening 15, such for example, as the plate spring arms 18 at intervals around the ring 10 underneath the flange 17 and each secured at one end to the ring side wall 16, as for example by spot welding, as indicated at 19; these arms 18 being flared outwardly from the ring 10 and having tilted outer ends 20 which resiliently engage the margin of the range top opening 15 in a manner to hold the heating unit securely in a centered position in the opening 15.

The mounting ring 10 is provided with a removable pan-like bottom 21 which underlies the heating unit and for supporting this pan 21 the side wall 16 of the ring is provided at its lower end with an inwardly extending annular flange 22 providing a ledge to receive the rim 23 of the pan 21 thereon. This pan 21 is of tube type with a large central frusto-conical tube portion 24 which projects upwardly to approximately the level of the pan rim 23 and is open at the top for ventilation purposes.

For mounting the spider 12 in the ring 10, the sloping side wall 16 is pressed outwardly at intervals therearound to form internal ledges 25 to receive the outer ends of the spider arms 26 removably thereon, and this spider, which is preferably of sheet metal, flanged at the margins for reinforcing, is provided with a central portion 27 which overlies the open upper end of the center tube 24 of the pan 21 to prevent dripping or spillage into the open upper end of the tube and deflect such dripping or spillage into the annular recessed bottom of the pan.

The heating unit is of metal tubular sheathed type, such as shown in William R. Tuttle Patents Nos. 2,506,554 and 2,643,317, having one or more heating resistances extending lengthwise within a metal tube or sheath 28 and embedded in compacted heat conductive electrical insulation 29 by which the resistance or resistances are electrically insulated from one another and from the sheath, and this tube with resistances and insulation therein is shaped in the form of a flat spiral with several intercalated coils 30 which constitute the active portion of the heating unit and are flattened at the top to provide wide area of contact with a pan or receptacle placed thereon.

The inner end of the tube or sheath 28 which is at the inner end of the inner coil 30 is closed, as indicated at 31, and at its outer end the tube 28 has a straight portion 32 which is unflattened and of circular cross section and projects substantially tangentially from the outer end of the outer coil 30 and is inclined downwardly at a slight inclination to the top face of the active portion or coils 30 of the unit, as shown in Fig. 2 and extends through the hinge 13.

The heating unit is shown herein with two resistances 33 and 34 therein which are located near the flat top of the coils 30 and are connected at their inner ends within the closed end 31 of the tube or sheath by a connector 35 to a return wire 36 which is located near to the bottom of the coils 30 and extends back therethrough and has a terminal portion 36ª thereof extending outward through the straight outer end portion 32 of the tube into a terminal block 37 of insulating material which is attached to the outer end of the tube 28.

The resistances 33 and 34 are helical windings of resistance wire and, as is customary in surface heating units of the tubular sheathed type, have terminal conductors 33ª and 34ª connected respectively thereto within the sheath 28 and projecting outwardly through the outer end of the sheath into the terminal block 37 which is provided with three terminal screws 33ᵇ, 34ᵇ and 36ᵇ to which the terminal wires 33ª, 34ª and the terminal portion 36ª are respectively connected. The resistances 33 and 34 terminate and have the terminal wires 33ª and 34ª connected thereto, in accordance with conventional practice, at the outer extremity of the active portion of the heating unit, in the immediate vicinity of the bend where the straight end portion 32 of the tube 28 extends downwardly from the outer end of the outer coil 30 so that the inclined outer end 32 of the heating unit is not subjected to the heat generated by the resistances and remains at a substantially lower temperature than the coils 30.

The terminal block 37 is of two part construction, like that of Jacob L. Shroyer application Serial No. 518,055, composed of upper and lower halves 38 and 39 respectively which are secured together by bolts 40, and a ground strap 41, which is connected to the outer end of the tube 28, projects laterally from the side of the terminal block 37 at the upper end thereof, as shown in Figs. 1, 2 and 3.

The straight end portion 32 of the tube or sheath 28 is arranged at such inclination to the top surface of the active portion or coils 30 of the heating unit, for example at approximately a 27 degree angle thereto, that it extends through the side wall 16 of the mounting ring above the removable pan 21, an opening 42 being provided in the side wall 16 for this purpose, and it is important to note, for reasons explained hereinafter, that the opening 42 is in the form of a notch which extends upwardly in the side wall 16 from the bottom thereof, the pan supporting flange 22 being interrupted at that place, as shown in Fig. 3, and thus the opening 42 is open at the bottom except when the pan 21 is in place with the rim 23 thereof on the flange 22.

The hinge 13 comprises a bearing which is carried by the mounting ring 10 and has the straight end portion 32 of the heating unit tube extending therethrough and turnable therein to permit the movement of the heating unit to and from the upraised position at the side of the mounting ring, and it is to be noted that this bearing and the facilities by which it is mounted on the mounting ring consists of only two parts—one of which serves as a combined mounting bracket and half bearing, and the other merely as a half bearing only.

Both of said parts are of sheet metal, and the main one thereof which serves as a mounting bracket and half bearing is indicated as a whole at 43 and secured directly to the mounting ring 10, and is bent at 44, as shown in Fig. 4 to provide a flat top portion 45 at substantially the same inclination as the heating unit end portion 32 and a substantially vertical portion 46, which two said portions 45 and 46 provide the top and one side respectively of the bearing and constitute the half bearing portion of the mounting bracket, and the flat top portion 45 is continued laterally as at 47 and, along a curved line which corresponds to the peripheral curvature of the side wall 16 of the mounting ring and is distant from the bearing top wall 45 at the outer end of the bearing and close to the top wall 45 at the inner end of the bearing, is provided with an upwardly extending attaching flange 48 which is located at one side of the opening 42 and shaped to conform to the mounting ring side wall 16 at that place and spot welded thereto at several places, as indicated at 49. This continuation 47 is provided at a place intermediate of the ends of and near the bearing with a tongue 50 which is cut therefrom.

The vertical wall 46 of the part 43 is extended forwardly from the inner end of the bearing, as indicated at 51, to the mounting ring side wall 16 at the other side of the opening 42 and terminates in a wing portion 52 which conforms to and is spot welded at several places to the side wall 16 at that place, as indicated at 53 in Fig. 4.

Thus the member 43 straddles the opening or notch 42 of the mounting ring side wall 16 through which the outer end 32 of the heating unit extends and serves to reinforce the side wall 16 at the notched place.

The above mentioned forward extension 51 of the wall 46 is bulged as indicated at 54 in Fig. 3 to provide desired separation from the heating unit end 32 at that place and an outturned stiffening flange 55 extends along the bottom of the vertical wall 46 and is continued along the bottom of the forward extension 51 and along the bottom of the end wing 52, as shown in Fig. 2, and this flange 55 is provided between the ends of the bearing with two tongue receiving slots 56.

The other above mentioned part which serves as a half bearing only is indicated as a whole at 57 and is bent at 58 to provide an upright or vertical wall 59 and another wall 60 at right angles to the wall 59, and which said walls 59 and 60 provide the other side wall and the bottom wall respectively of the bearing.

The wall 60 has a portion along the edge thereof which extends part way under the portion of the flange 55 along the bottom of wall 46 and is provided with two tongues 61 spaced apart to be received in the slots 56 for fastening the part 57 to the flange 55, and these tongues 61 are offset at the place where they extend through the slots 56 and each has a lug 62 at the offset, as shown particularly in Figs. 4 and 7, to prevent accidental withdrawal of the tongues from the slots.

The wall 59 is provided along its upper edge with an outturned flange 63 which underlies the extension or web 47 of the bracket part of the bearing and this flange 63 has a slot 64 to accommodate the tongue 50.

Thus the engagement and interlocking of the tongues 50 and 61 with their respective slots 64 and 56 secures the half bearing part 57 to the half bearing part 45, 46 of the bracket 43 to provide the bearing for the outer end 32 of the heating unit, and it is to be understood that the bearing is so arranged with respect to the mounting ring 10 that when the said heating unit end 32 is engaged therein, the active portion or coils 30 of the heating unit will lay down flat and solidly on the spider 12.

To insure sufficient freedom of movement of the heating unit end 32 in the bearing to avoid any restriction which might interfere with such flatwise and solid support of the coils 30 on the spider, the side walls 46 and 59 of the bearing are made somewhat wider than the top and bottom walls 45 and 60 thereof so that the heating unit end 32, although fitting quite closely between the bearing side walls 46 and 59, has sufficient freedom of up and down and tilting movement between the top and bottom walls 45 and 60, as indicated in Fig. 4, so that the end 32 can adjust itself in the bearing to some variation of flatwise support of the heating unit coils 30 on the spider 12 and affords freedom of the coils 30 to lay freely on the spider.

The inner end of the bottom wall 60 of the bearing is provided with a downturned flange 65, as shown in Figs. 3 and 4, and at its outer end the bearing is annularly flanged, one portion 66 of the flange being on the bearing half 43, 46 and continued along the rear edge of the bracket web portion 47, as indicated at 67, and the other portion 68 being on the bearing half 57.

Facilities are also provided for the quadruple purpose of preventing endwise movement of the heating unit end 32 in the bearing 45, 46, 57, stopping the upward swinging movement of the heating unit, releasably holding the heating unit in the upraised position, and obstructing passage of grease or oils from the cooking operations to the lower end of the inclined heating unit portion 32 and to the terminal block 37, and these quadruple facilities comprise an apertured washer-like disk 69 which is secured to the inclined heating unit portion 32 near the lower end thereof to rotate therewith and cooperates with certain parts, formations or continuations of the flanges 66, 68 and 69.

It is important that the disk 69 be secured sufficiently tightly to the heating unit tube or sheath 28 to prevent creepage of grease or oils along the tube past the disk 69, and accordingly the disk 69 is fastened on the tube 28 by embedding the inner periphery of its aperture into the wall of the tube 28, as indicated at 70 in Fig. 6, which may be accomplished by initially forming the disk 69 with a flared or conical wall portion surrounding the aperture thereof, as indicated by the dotted lines at 71 in Fig. 6, and then, after the disk has been slipped into place on the end of the tube 32, compressing the disk 69 between opposed flat faces of a pair of ring dies which encircle the tube 32 and are relatively movable toward one another and thereby flattening the flared or conical wall portion 71.

It is also important, for reasons hereafter explained, that the disk 69 be keyed to the tube 32 sufficiently securely to preclude any possible relative turning movement of the disk on the tube when subjected to a considerable turning strain and for this purpose the internal edge portion of the disk which is embedded in the wall of the tube 32, as aforesaid and indiacted at 70 in Fig. 6, is offset inwardly at intervals around the tube 32 so as to be embedded at greater depth in the tube wall at these selected intervals, as indicated at 72 in Figs. 5 and 6 and thereby key the disk to the tube at these places against relative turning movement of the disk 69 and the tube 32.

For producing these offsets 72 the disk 69 is punched or compressed to a substantially decreased thickness at the selected intervals around the aperture thereof which contains the tube and quite close to the inner periphery of the disk, as indicated at 73 so that metal of the disk is extruded inwardly at each such place to produce the offsets 72.

This punching or localized compression of the disk 69 at the places 73 may be accomplished in any convenient manner, either independent punching or compressing at each place 73, or one of the dies which compress the flaring or conical wall portion 71 to the flat form, may have projections on the compression face thereof which produce the depressions 73 at the same time that the disk 69 is flattened.

This disk 69 serves to prevent endwise movement of the heating unit end 32 in the bearing 45, 46, 57 and to cooperate with the disk to accomplish this purpose, the outturned flange 55 at the bottom of the bearing side wall 46 is continued beyond the rear end of the bearing, as indicated at 74 in Figs. 2 and 3, and this flange continuation 74 has a narrow notch 75 in which the periphery of the disk 69 projects and by which the latter is maintained at all times directly at the outer end of the bearing.

The disk 69 is further maintained in this position at the end of the bearing by a leaf spring extension 76 from the edge of the flange 67 of the bracket web 47 which is bent downwardly and has the round lower end 77 thereof bearing resiliently at all times against the outer face of the disk 69 and tending to hold the disk against the flanges 66 and 68 at the outer end of the bearing 45, 46, 57.

It is desirable to provide a stop to limit the turning movement of the heating unit end 32 in the bearing 45, 46, 57 when the heating unit is turned up to the desired upraised position at one side of the mounting ring 10, and for this purpose the disk 69 is formed at the appropriate place with a shoulder 78 which, as the heating unit is tilted upwardly, swings underneath the spring arm 76, and the flange 63 which projects laterally from the upper end of a bearing side wall 59 has a portion 79 extending rearwardly into the space within the looped upper end of the spring 76 as shown in Fig. 6 to provide an abutment against which the shoulder 78 engages, as indicated by dotted lines in Fig. 5, when the heating unit reaches the desired upraised position and thereby limits further movement of the heating unit.

Moreover, a latch is also provided to releasably retain the heating unit in the upraised position, and for this purpose the disk 69 is provided with a hump formation 80 projecting from the rear face thereof, which when the heating unit nears the desired upraised position rides under the rounded lower bearing end 77 of the spring 76 to a position above that bearing end, as indicated by dotted lines in Fig. 5, and as the spring 76 is biased to bear at a substantial tension against the disk 69 the location of the hump above the rounded bearing end 77 of the spring, as aforesaid, provides a resilient latching of the heating unit in the upraised position.

It is preferred to provide a support to engage the disk 69 so as to hold the outer end of the inclined portion 32 of the heating unit substantially midway between the upper and lower limits of the bearing opening, as it is indicated by the dotted lines at 32 in Fig. 4, and for this purpose a slotted tongue 81 is provided at the rear end of the bottom wall 60 of the bearing, which is bent downwardly, as indicated at 82 in Fig. 2, and has the lower end portion 83 thereof bent outwardly to lie underneath the periphery of the disk 69 to loosely support the latter at the desired elevation.

In some instances, the tops of ranges are formed with a heating unit opening which has a downturned flange around the opening, integral with the range top to serve the same purpose as the annular wall 16 of the above described mounting ring and thereby dispensing with the necessity of employing a separate mounting ring, the heating unit, in such cases being hinged directly to the underside of the range top or to the depending flange around the opening; and in such cases the invention hereof is applicable thereto by utilizing the depending flange of the range top in the same manner as the side wall 16 of the mounting ring is employed herein, by providing the depending flange of the range top with an opening corresponding to the opening 42 hereof and hinging the heating unit to the outer side of the range top flange by a hinge 13 which is secured to the range top flange in the same manner as the hinge 13 hereof is secured to the annular wall 16 of the mounting ring 10.

From the foregoing it will be understood that the hinge 13 is of a particularly simple and convenient form as the support for the heating unit end 32 is composed of only two pieces of sheet metal which provide in these two pieces all of the parts required for holding the heating unit end and controlling the movement thereof in the bearing, and also all the parts for fastening the two pieces of sheet metal together, and the fasteners are of such a nature that the two parts may be readily and quickly assembled, or the one detached from the other if necessary.

Moreover, the one piece of the hinge is shaped and arranged so that it straddles the opening in the side wall of the mounting ring and is secured to side wall portions at the opposite sides of the opening so as to reinforce the side wall at this place, and furthermore the heating unit may be completely assembled with terminal block and all attachments before application to the mounting ring as the removable pan 21 and notch form of opening 42 permits the completely assembled heating unit to be installed in the mounting ring 10 by merely inserting the terminal end portion of the heating unit downwardly through the bottom opening of the mounting ring 10 while the pan 21 is removed, and then lifting the end portion 32 of the heating unit up into position under the top wall 45 and at the inner side of the side wall 46 of the half bearing of the bracket member 43, and then placing the half bearing 57 in position with the tongues 61 thereof engaged in the slots 56 and, the tongue 50 then being in the position indicated by the dotted lines 50a of Fig. 4 at that time, the half bearing 56 is swung up to the position shown in Fig. 4 with the depending tongue 50 fully engaged in the slot 64, whereupon the tongue 50 is bent upwardly from the 50a dotted line position thereof to the full line position thereof and the heating unit is thereby completely assembled with the mounting ring.

While I have shown and described my invention in a preferred form, various changes and modifications may be made therein without departing from the spirit of my invention, the scope of which is to be determined by the appended claims.

What is claimed is:

1. A heater and mounting assembly which comprises a tubular sheathed embedded resistor heating unit in the form of a flat winding with a substantially tangential extension, a thin walled mounting having a depending annular wall defining an opening in the upper end of which the winding is removably supported with the extension projecting outwardly through said annular wall, and a bearing on the outer side of said annular wall in which said extension is pivoted for swinging of the flat winding from said opening to an upraised position at one side thereof, the said bearing being composed of two parts which conjointly form the bearing and one of which is a bracket member with a flat wall of sheet metal secured to and projecting outwardly from said annular wall and having the outer end portion thereof bent downwardly to form a corner seat and the other of which is a sheet metal plate bent to form a corner seat which is opposed to the other corner seat and has a bottom wall at the inner side of and extending toward and connected to the bent down outer end portion of the said flat wall of the bracket and has a side wall extending upward from said bottom wall toward and connected to said flat wall.

2. A heater and mounting assembly as defined in claim 1 and wherein the downwardly bent outer end portion of the flat wall of the bracket member has a continuation thereof at one end extending toward and secured to the annular wall at a place circumferentially spaced from the place of securement of said flat wall to the annular wall.

3. A heater and mounting assembly as defined in claim 1 and wherein the downwardly bent outer end portion of the flat wall of the bracket member has a continuation thereof at one end extending toward and secured to the annular wall at a place circumferentially spaced from the place of securement of said flat wall to the annular wall, and between the place of securement of said flat wall to the annular wall and the place of securement of said continuation to the annular wall the annular wall has an opening therethrough through which the substantially tangential extension of the winding extends.

4. A heater and mounting assembly as defined in claim 1 and wherein the downwardly bent outer end portion of the flat wall of the bracket member has a continuation thereof at one end extending toward and secured to the annular wall at a place circumferentially spaced from the place of securement of said flat wall thereto and the said downwardly bent outer end portion and continuation thereof have an outturned flange along the lower edge throughout the length thereof.

5. A heater and mounting assembly as defined in claim 1 and wherein the downwardly bent outer end portion of the flat wall of the bracket has an outturned flange along the lower edge thereof and the said sheet metal plate which is bent as aforesaid to form the second mentioned corner seat has a tongue and slot connection with said flange.

6. A heater and mounting assembly which comprises a tubular sheathed embedded resistor heating unit in the form of a flat winding with a substantially tangential extension, a thin walled mounting having a depending annular wall defining an opening in the upper end of which the winding is removably supported with the extension projecting outwardly through an opening provided therefor in said annular wall, and a bearing on the outer side of said annular wall in which said extension is pivoted for swinging of the flat winding from said opening to an upraised position at one side thereof, the said bearing having an access opening at the bottom and said opening in the annular side wall having an entrance at the bottom through which said entrance and access opening the extension of the flat winding is conjointly enterable by movement of said extension sidewise in a direction upwardly.

7. A heater mounting assembly which comprises a tubular sheathed embedded resistor heating unit in the form of a flat winding with a substantially tangential extension, a thin walled mounting having a depending annular wall defining an opening in the upper end of which the winding is removably supported with the extension projecting outwardly through said annular wall in which said extension is pivoted for swinging of the flat winding from said opening to an upraised position at one side thereof, the said bearing having an access opening at the bottom through which the extension of the winding is enterable by sidewise movement thereof and the bearing and said extension having parts which are cooperatively engaged by such sidewise movement to hold the said extension against endwise movement in the bearing.

8. A heater and mounting assembly as defined in claim 7 and wherein the bearing has a notch at the outer end and the extension has an annular flange thereon which are cooperatively engaged by said sidewise movement to prevent endwise movement of the extension in the bearing.

9. A heater and mounting assembly as defined in claim 7 and wherein the bearing has a spring latch member thereon and the extension has an annular flange thereon which are interengaged by said sidewise movement and the flange has an offset with which said latch member cooperates to hold the flat winding in a selected position of it's pivotal movement.

10. A heater and mounting assembly as defined in claim 7 and wherein the bearing has a stop abutment and the extension has an annular flange with a stop which are cooperatively positioned by said sidewise movement and are cooperable to limit the swinging movement of the flat winding.

11. A tubular sheathed embedded resistor heating unit having an end portion with an annular flange thereon, the said flange being a metal disk with an opening therethrough through which said end portion extends, the said disk having at spaced apart places around and in close proximity to the said end portion locally compressed areas from which the metal thereof is extruded inwardly toward the center of said opening into the sheath of said end portion to lock the disk on said portion against relative rotation.

References Cited in the file of this patent

UNITED STATES PATENTS

| | | |
|---|---|---|
| 2,508,552 | Tuttle | May 23, 1950 |
| 2,610,281 | Rutenber et al. | Sept. 9, 1952 |
| 2,632,837 | Andersen | Mar. 24, 1953 |
| 2,754,402 | Pearce | July 10, 1956 |